March 5, 1963     F. MUSZYNSKI     3,079,719
DUCK DECOY
Filed Oct. 30, 1959
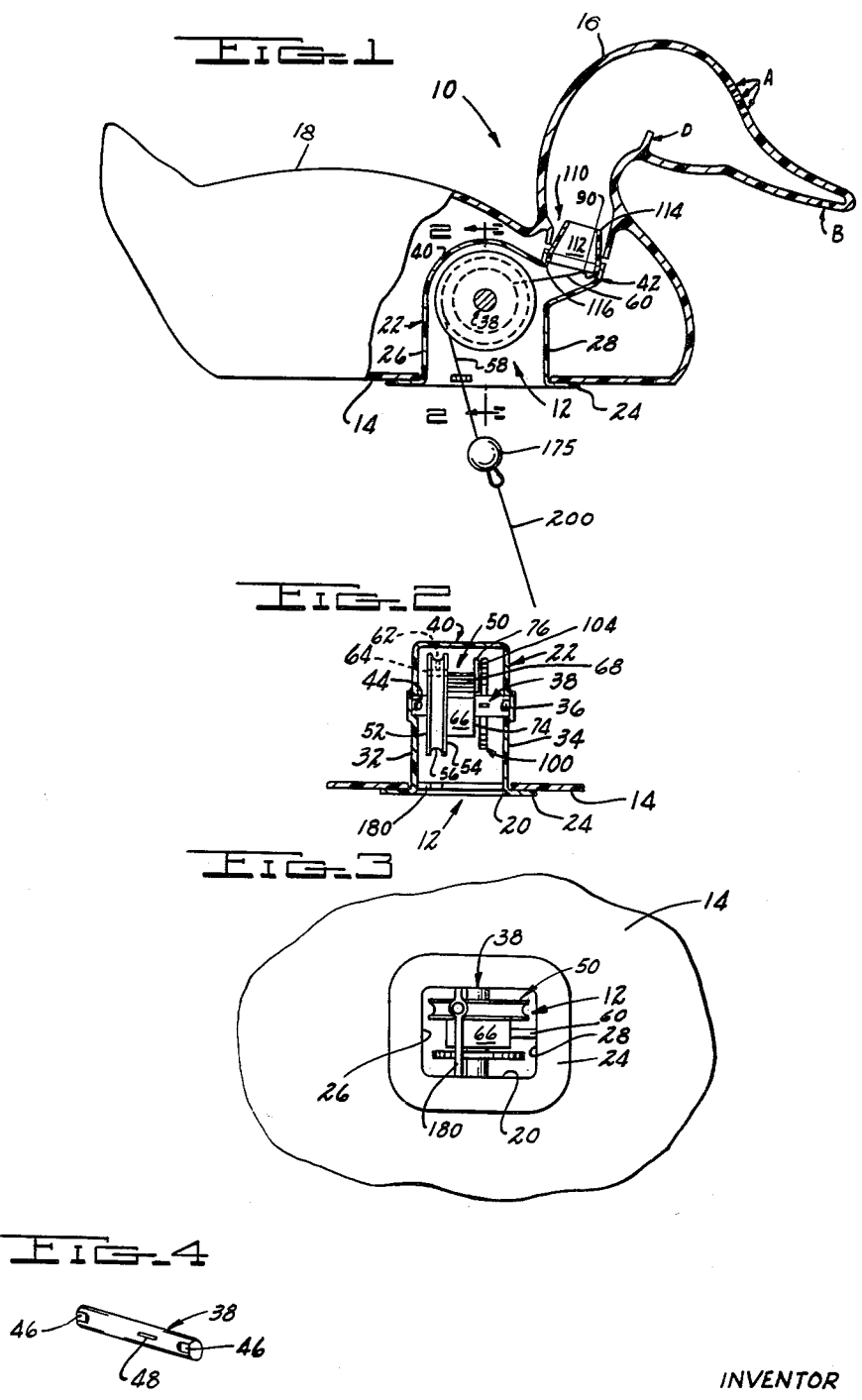
INVENTOR
FRANCIS MUSZYNSKI
KOTTS & SHERIDAN
ATTORNEYS 3,079,719
DUCK DECOY
Francis Muszynski, 24460 Chernick Drive,
Taylor Center, Mich.
Filed Oct. 30, 1959, Ser. No. 849,900
7 Claims. (Cl. 43—3)

The present invention relates to new and useful improvements in decoys and more particularly to a decoy construction which will quack automatically when placed in uncalm water.

While a floating decoy is not a new device, the present invention as well as my co-pending application Serial No. 658,546, filed May 13, 1957, now Patent #2,917,857 provides a new approach to an old problem. The problem is that of having freedom of bodily movement and use of the hands while hunting, unhampered by the necessity of holding and operating a conventional duck call.

Conventional decoys are placed in the water by the hunter near a duck blind and merely float quietly on the surface of the water. To attract ducks the duck hunter uses his hands and mouth to imitate a duck call.

The present invention, when placed in moving water, floats realistically on the surface thereof and quacks automatically while it is anchored. This novel construction allows the hunter to observe the surrounding area at all times.

Therefore it is an object of the present invention to provide an automatic quacking decoy, which is not only realistic in size and shape, but one which will attract ducks readily and call them within range of the hunters gun.

Another object of the present invention is a provision of a decoy which will operate to quack automatically, while remaining anchored in moving water.

Still another object of the present invention is the provision of an automatic quacking decoy which decoy may be readily disengaged from the anchor line.

It has been found that the foregoing and related objects can be accomplished by the provision of an automatic quacking decoy having a first hollow body housing; an opening in said body housing; a portion of said hollow body housing forming a sounding box; a quacking mechanism secured in said housing opening; said quacking mechanism comprising a second generally hollow housing; a horizontal shaft secured in said second housing; a reel having a hub rotatably mounted on said shaft; serrations on a portion of said reel hub; a torsion spring affixed intermediate said reel and said shaft; a line affixed to the circumferential portion of said reel; a vibrating diaphragm affixed to said second housing portion; a vibrating member positioned intermediate said diaphragm and said serrated hub and in engagement therewith; rotation of said hub by movement of said line actuating said vibrating member and diaphragm to imitate the sounds of a duck.

Other objects of this invention will appear in the following description and appended claims, reference being had to the accompanying drawings forming a part of this specification wherein like reference characters designate corresponding parts in the several views.

In the drawings:

FIG. 1 is a cross sectional view of an automatic quacking decoy assembly embodying the present invention.

FIG. 2 is a cross sectional view taken on line 2—2 of FIG. 1.

FIG. 3 is a bottom plan view of FIG. 1 partially broken away.

FIG. 4 is a perspective view of the reel shaft.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings, FIG. 1 represents a floating decoy which quacks automatically and embodies the present invention. The decoy assembly 10 has mounted in the bottom 14 thereof, a quacking assembly 12. While the quacking assembly 12 is shown mounted on the bottom surface 14 of the decoy assembly 10, it could be mounted with equal effectiveness in the head 16 or on the back 18 (top) of the decoy.

The quacking assembly 12 is mounted in the hollow body portion of the decoy 10. The quacking assembly proper is housed in a second housing 22. The opening 20 in the base portion of the second housing 22 is generally rectangular in configuration and is best viewed in FIG. 3 of the drawings. A base flange 24 extends around the periphery of the housing 22 and may be mounted on the bottom surface 14 of the decoy by any suitable means. Although the front and rear walls 26 and 28 of the housing 22 are shown as being perpendicular to the base portion, they could of course, be angular or curved. However, the sidewalls 32 and 34 of the housing are generally in parallel relationship. The top rear section 40 of the second housing 22 is a radial configuration while the forward portion of the top has an extension 42 thereon for receiving the diaphragm assembly 90. This portion will be described later.

A blind opening 36 is located in each side wall 32 and 34 of housing 22 for positioning and retaining a shaft member 38. The blind openings 36 are positioned in alignment and spaced equidistant from the base flange portion 24. Each of the blind openings 36 has a flat section 44 thereon to prevent rotation of the shaft 38 within the housing 22. A similar flat portion 46 is located on each end of the shaft 38. The flat portions of the openings and shaft could of course, be of any configuration which would prevent rotation when the unit is assembled. The shaft 38 is shown in FIG. 4 of the drawings, to best illustrate the end configuration of the shaft and the axial slot 48 which is formed therein.

Mounted concentrically on shaft 38 is a reel member 50. The reel 50 has two generally parallel sidewalls 52 and 54 separated by a depressed land area 56 adapted to receive an actuating line 58. The actuating line 58 is anchored to the reel 50 by inserting one end of the line through a vertical opening 62 located intermediate the sidewalls 52 and 54 and knotting same in the horizontal cross-hole 64 which intersects opening 62.

Extending from the reel sidewall 54 is serrated hub member 66 of reduced diameter. The serrations 68 extend above the circumferential surface of the hub 66 and cover only a small portion of the periphery thereof. The end 74 of hub 66 is generally parallel with face 54 and square with the diameter of the reel proper. Mounted on the end 74 of hub 66 is a finger member 76. The finger member is adapted to receive the outer end of a torsion spring 100. The inside end of the torsion spring 100 is affixed to the axial slot 48 in shaft 38. A pin member 104 or any other suitable means is secured to the torsion spring 100 for affixing said spring to the finger member 76.

The forward portion of extension 42 is circular in configuration and is adapted to underlie a downwardly depending circular section 110 in the decoy housing 10. A flanged opening 116 is provided in extension 42. A circular plug member 112 with a tapered end section 114 is positioned in the opening 116. The base of the tapered plug member 112 has a diaphragm 90 mounted intermediate the tapered plug member 112 and the flange portion of the housing. Also positioned intermediate the diaphragm 90 and the flange is a leaf spring member. The leaf spring member 60 being positioned to overlie the serrations 68 in the hub member 66 in spaced relationship. Therefore, as the anchor line and actuating line 58 is caused to be moved, the leaf spring 60 engages the serrations 68 on the reel hub 66. Each time the leaf spring 60 engages the serrations 68, a sound is made. This sound emanating above the diaphragm 90 and out through the openings "A" in the head 16. Openings "A" are provided in the head 16 to emit the sounds emanating from the sounding box quacking assembly 12, while opening "B" is provided to drain any liquid which might collect in the bill. The lip "D" forms an effective flange for limiting the flow of any liquid which might have drained from the bill, the displacement of which might render the quacking assembly 12 inoperable or ineffective until such time as the liquid were removed.

The complete quacking assembly is substantially enclosed within the body cavity and although no bottom is shown on the assembly, entrapped air prevents water from rising above a predetermined level in the housing cavity. Additionally, a wire line guide 180 is positioned across housing 22 in alignment with the depressed land portion of the reel to prevent tangling of the line. If a bottom is used on the housing 22, a tube is used as the guide means. A spherical member 175 is affixed to the actuating line 58 to provide a stop for limiting windup of the actuating line. The spherical member 175 also has a loop therein, for providing a means for affixing an anchor line 200.

Operation

When the decoy 10 of the present invention is about to be used, an anchor line 200 is affixed to the reel actuating line 58. The anchor line 200 is of sufficient length to positively anchor the decoy. The decoy 10 is then placed in moving water. Movement of the water in which the decoy is anchored causes the anchor line 200 to lengthen and shorten. As the motion of the water reacts against the anchored decoy, the torsion spring is caused to wind. As rotation of the reel 50 occurs the free end of the leaf spring is actuated against the serrations 68 on the hub 66. This in turn causes the anchored end of the leaf spring to engage the diaphragm 90 intermittently and emit sounds similar to that of a quacking duck.

From the foregoing description it will be readily apparent to those skilled in the art that the automatic quacking decoy herein described is simple in operation and permits the hunter using the device complete freedom of bodily movement. The present invention also eliminates the necessity of constantly retrieving a decoy which has floated away. Further, the hunter may anchor several automatic quacking decoys 10 of the present invention to simulate the sound of a covey of ducks, whereas a hunter using a conventional duck call can imitate only a single duck at any given time.

Having thus described my invention, I claim:

1. An automatic quacking decoy assembly having a first body housing; a second housing in said first housing; said second housing adapted to receive a quacking assembly; a non-rotatable shaft mounted in said second housing; a reel rotatably mounted on said shaft; a hub of reduced diameter on said reel; a torsion spring interposed between said shaft and said reel; axial serrations on a portion of the circumference of said hub; an actuating line, one end of said actuating line secured to said reel, the other end to an anchor line; a vibrating diaphragm secured to said second housing; vibrating means in the form of a leaf spring interposed between the diaphragm and the serrations on the said hub; movement of said line when decoy is anchored causes tension on said line to rotate said reel in one direction winding said torsion spring, release of said tension causing rotation of said reel in the opposite direction; each rotation movement actuating said vibrating means to make a quacking sound.

2. A device as in claim 1 wherein the actuating line has a guide means for accurately winding said line on said reel.

3. An automatic quacking decoy assembly with a first body housing having a cavity therein containing a quacking assembly; a shaft mounted in said body housing; a reel rotatably mounted on said shaft; serrations on said reel; an actuating line having two ends, one end of said actuating line secured to said reel, the other end to an anchor; vibrating means adapted to engage the serrations on said reel; rotation of said reel causing a quacking sound when said decoy is placed in moving water; and rewind means to automatically permit reactuation of the vibrating means.

4. A device as in claim 3, wherein the serrations are substantially parallel to the horizontal axis of the reel and cover only a segment of the circumference.

5. An automatic quacking decoy assembly having a first body housing simulating that of a duck; said first body housing having a cavity therein adapted to receive a quacking assembly; a second housing member; a shaft mounted in said second housing member; a reel rotatably mounted on said shaft; a hub on said reel, said hub having serrations thereon; an actuating line having two ends, one end of said actuating line secured to said reel, the other end to an anchor line; a torsion spring interposed between said shaft and said reel; vibrating means interposed between the sidewalls of said second housing and said serrated hub; an anchor line secured to said actuating line on one end and to an anchor on the other end; extension of said actuating line rotating said reel to operate said vibrating means to cause a quacking sound when said decoy assembly is anchored in moving water; said torsion spring retracting said actuating line to permit reactuation of said vibrating means.

6. An automatic quacking decoy assembly having a hollow first body housing simulating that of a duck; a second housing in said first hollow housing; a fixed shaft mounted in said second housing; a reel rotatably mounted on said shaft; a spring interposed between said reel and said shaft; an actuating line, one end of said actuating line secured to said reel, the other end to an anchor line; serrations on said reel; vibrating means affixed to said second housing and adapted to engage the serrations on said reel; extension of said actuating line rotating said reel in one direction, said spring retracting said actuating line to rotate said reel in the opposite direction; rotation of said reel operating said vibrating means to cause a quacking sound when said decoy is anchored in moving water.

7. A device as in claim 6, wherein said serrations are positioned on the side of said reel and extend radially.

References Cited in the file of this patent

UNITED STATES PATENTS

| | | |
|---|---|---|
| 1,789,649 | Gazecki et al. | Jan. 20, 1931 |
| 2,528,759 | Krakowski | Nov. 7, 1950 |
| 2,539,727 | Clark | Jan. 30, 1951 |
| 2,747,314 | McGregor | May 29, 1956 |